United States Patent
Canfield

[15] 3,665,168
[45] May 23, 1972

[54] ADAPTIVELY CONTROLLED POSITION PREDICTION SYSTEM

[72] Inventor: Eugene Beach Canfield, Vestal, N.Y.
[73] Assignee: General Electric Company
[22] Filed: Dec. 18, 1970
[21] Appl. No.: 99,600

[52] U.S. Cl....................235/150.2, 114/222, 235/150.1
[51] Int. Cl........................................................G06f 15/50
[58] Field of Search............235/150.2, 150.1, 61.5 R, 61.5 E, 235/61.5 S; 318/588, 580; 114/122

[56] References Cited

UNITED STATES PATENTS

| | | |
|---|---|---|
| 2,901,996 | 9/1959 | Bell....................................114/122 |
| 3,221,238 | 11/1965 | Unger et al. ...................235/150.2 X |
| 3,428,788 | 2/1969 | Fisher et al. ......................235/150.2 |

Primary Examiner—Eugene G. Botz
Attorney—John F. McDevitt, Frank L. Neuhauser, Oscar B. Waddell and Joseph B. Forman

[57] ABSTRACT

Ship's position predictor using sampled-data signal as input to a two-point predictor computer and having an adaptive correction system responsive to the predictor computer output for refining the prediction.

7 Claims, 9 Drawing Figures

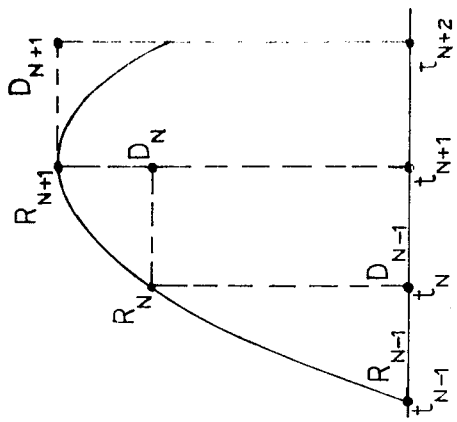
FIG. 1 ZERO ORDER PREDICTION
$D_N = R_N$
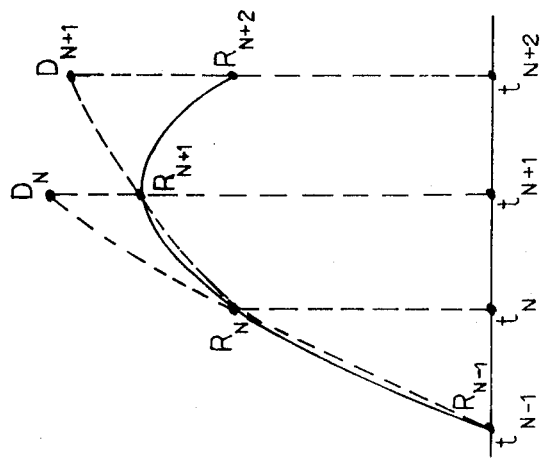
FIG. 2 FIRST ORDER PREDICTION
$D_N = R_N + (R_N - R_{N-1}) = 2R_N - R_{N-1}$
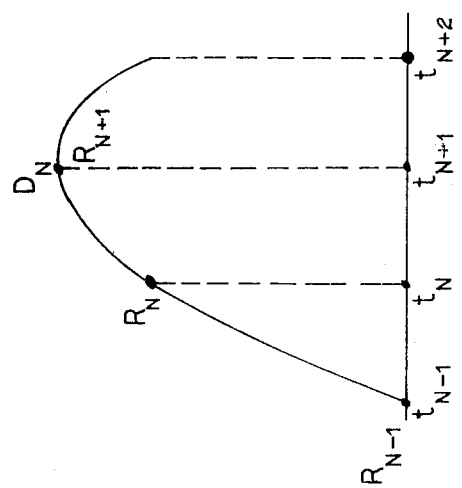
FIG. 3 SINUSOIDAL TWO-POINT PREDICTION
$D_N = R_{N+1} = 2R_N \cos(\omega_R T_s) - R_{N-1}$
INVENTOR
EUGENE B. CANFIELD
BY J.F. McDevitt
HIS ATTORNEY

TWO POINT STRAIGHT LINE PREDICTION

SINUSOIDAL TWO POINT PREDICTION

INVENTOR
EUGENE B. CANFIELD

BY *J.F. McDevitt*

HIS ATTORNEY

Patented May 23, 1972

$$E_N = (D_N - \theta_N) + (R_N - \theta_N) = D_N + R_N - 2\theta_N$$

$$E_N = (D_N - \theta_N) + (D_{N-1} - \theta_N) = D_N + D_{N+1} - 2\theta_N$$

INVENTOR
EUGENE B. CANFIELD

BY *(signature)*

HIS ATTORNEY $E_N = D_N + (R_N - D_{N-1}) - \theta_N$

INVENTOR
EUGENE B. CANFIELD

BY *J. McDevitt*

HIS ATTORNEY

ADAPTIVELY CONTROLLED POSITION PREDICTION SYSTEM

BACKGROUND OF THE INVENTION

The invention relates to a sampled-data system for predicting the periodic motion of a ship or other vehicle, thereby enabling power drives to follow the vehicle's motion.

Analog power drives have previously been used to follow a ship's motion. One prior system used lead networks on a position servo's stabilizing tachometer feedback to provide a high gain at ship's motion frequencies. Another prior system supplied a speed controller servo (e.g. the inner loop of a position servo) with a signal indicative of the rate of ship's motion developed by a stable element and an analog computer. Another prior system uses direct removal of ship's motion by on-mount gyro stabilization.

SUMMARY OF THE INVENTION

A sampled-data system allows the use of digital techniques to predict a future position or attitude of a ship or other vehicle based upon past measurements. For example, the roll of a ship is roughly sinusoidal, as determined primarily by the ship's natural frequency of oscillation and the frequency of the ocean's waves. It is necessary to compensate for this motion for gun directing servomechanisms and similar devices. The present invention provides a mathematically computed predicted value based solely upon previously sampled data. This computed predicted value is then further refined by comparison with the value which actually occurs in a process of adaptive correction.

BRIEF DESCRIPTION OF THE DRAWINGS

FIGS. 1, 2 and 3 are curve charts showing how various prediction equations follow a sinusoidal curve.

DESCRIPTION OF THE PREFERRED EMBODIMENTS

There are numerous prediction formulas for use in sampled-data systems, and no exhaustive listing can be given here. Those which follow are some of the simpler and more useful formulas, and are limited to the use of two points to predict a third point.

In a sampled-data system, signals are sampled regularly at a timing interval $T_s$. If one time instant is called $t_n$, the previous time instant ($T_s$ earlier) is called $t_n - 1$ and the later time instant is called $t_N - 1$, and so on. The value of signal $R$ sampled at $t_N$ is called $R_N$, and so on. The predicted signal value $D$ derived with data on hand at time $t_N$ is called $D_N$ and is a prediction of the value of $R_{N+1}$.

The simplest and least useful prediction is a zero-order or one-point prediction and merely assumes that $D_N = R_N$ or $R_{N-1} = R_N$. The results of such a prediction, as applied to a sinusoidal input signal are illustrated in FIG. 1.

Figure 7:
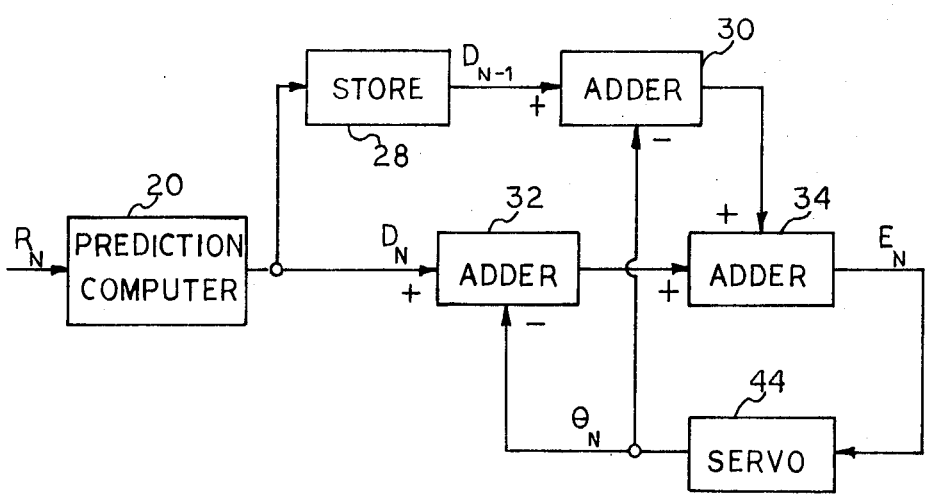
FIG. 7 is a block diagram of an adaptive correction system for deriving a correction signal based on the predicted position.

A better prediction is the two-point straight line prediction which assumes that $D_N = R_N + K(R_N - R_{N-1})$. If a first order prediction is used, the $K$ becomes one and the equation becomes $D_N = 2R_N - R_{N-1}$. This is illustrated in FIG. 7 in connection with a sinusoidal input signal. Rather large errors are still present with the sinusoidal signal.

A nearly perfect two-point prediction for a sinusoid can be obtained if the angular velocity $\omega_R$ of the sinusoid is known. The equation then becomes $D_N = 2R_N \cos \omega_R T_S - R_{N-1}$. The success of this equation in predicting sinusoid values is shown in FIG. 3.

Although a typical ship's motion is not precisely sinusoidal, use of the sinusoidal prediction of FIG. 3 typically gives less than half the error obtained using the first order prediction of FIG. 2.

Figure 4:
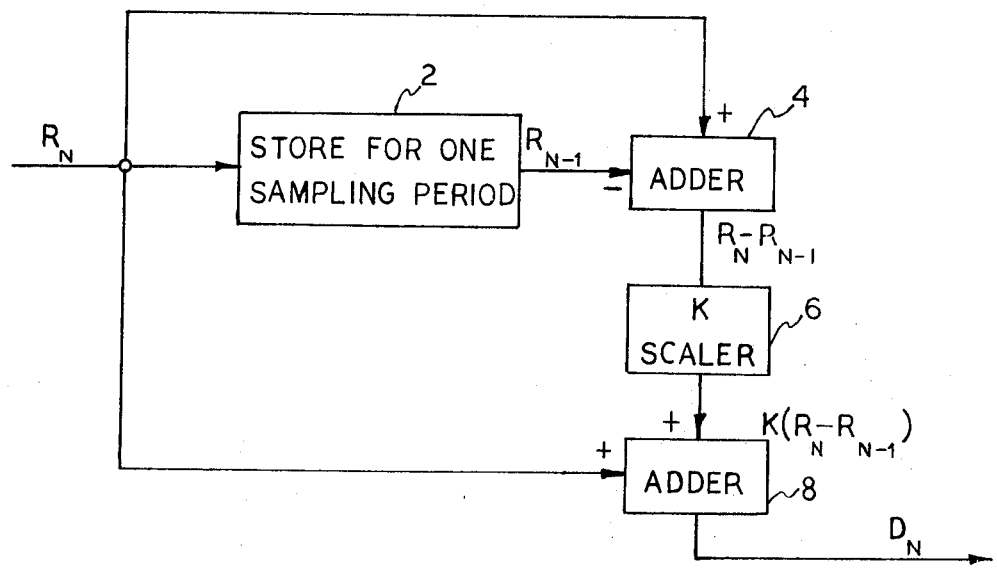
FIG. 4 is a block diagram of a system for making a first order prediction.

FIG. 4 is a block diagram of a computer for making the first order prediction according to the equation $D_N = R_N + K(R_N - R_{N-1})$. This prediction computer can be mechanized as a pulse analog or special-purpose digital computer or the equation can be programmed on a general-purpose digital computer. The input signal $R_N$ is stored in store 2 for one sampling period to derive signal $R_{N-1}$. Signal $R_{N-1}$ is subtracted from signal $R_N$ in adder 4 to derive signal $R_N - R_{N-1}$, which is scaled in scaler 6 to derive signal $K(R_N - R_{N-1})$. Signal $K(R_N - R_{N-1})$ is added in adder 8 to signal $R_N$ to derive predicted output signal $D_N$.

Figure 5:
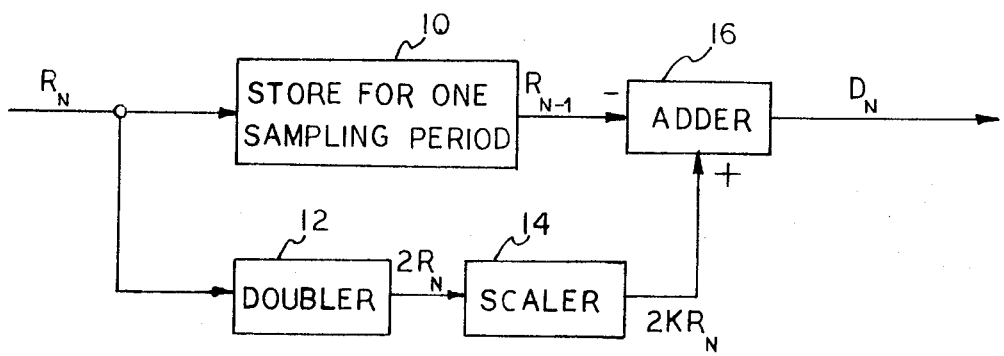
FIG. 5 is a block diagram of a system for making a sinusoidal two-point prediction.

FIG. 5 is a block diagram of a computer for making the sinusoidal two-point prediction according to the equation $D_N = 2R_N \cos \omega_R T_S - R_{N-1}$. This prediction computer can also be mechanized several ways. To simplify special-purpose computer mechanization of this equation, it may be desirable to set $\cos \omega_R T_S$ to a preset value K, allowing the mechanization of $D_N = 2KR_N - R_{N-1}$. In order to accommodate different sized ships with different predominate periods, the sampling period may be adjusted to keep $K$ a constant. However, any selection of $\omega_R$ for a particular ship will necessitate a compromise, because the roll and pitch periods of the ship will not be the same. In FIG. 5, the input signal is stored in store 10 for one sampling period to derive signal $R_{N-1}$. Signal $R_N$ is also doubled in magnitude doubler 12 and scaled in scaler 14 to derive signal $2KR_N$. Adder 16 is used to subtract signal $R_{N-1}$ from signal $2KR_N$ to derive the predicted output signal $D_N$.

Three types of adaptive correction are disclosed for application to the two disclosed prediction computers. Just as other prediction computers are possible, other adaptive correction systems may also be used in the correction of the predicted values. The adaptive control system of FIG. 6, when used in connection with the sinusoidal prediction system of FIG. 5, provided the best combination for the least error in following a typical ship's motion.

Figure 8:
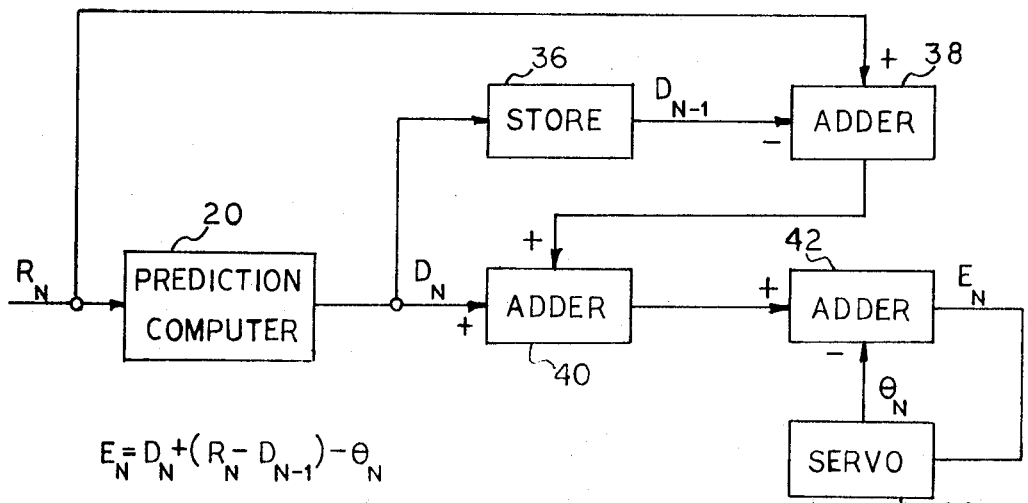
FIG. 8 is a block diagram of an adaptive correction system for correcting the predicted position.

However, first-order prediction according to FIG. 4 (where $K = 1$) used in connection with the adaptive control system of FIG. 8 is only slightly less accurate. Choice between these methods depends upon further evaluation of a large sample of the motion of the type of ship to be used and the relative complexity of implementation within available computers. In general, adaptive control according to FIG. 6 may be simplest because no additional storage of past data is required.

Figure 6:
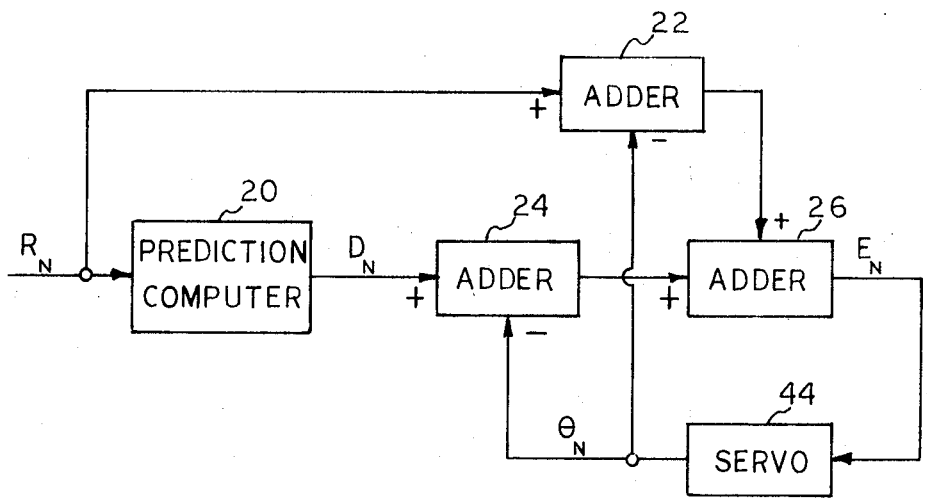
FIG. 6 is a block diagram of an adaptive correction system for deriving a correction signal based on the desired position.

FIGS. 6, 7, and 8 are block diagrams of various adaptive correction systems, each using the output of a prediction computer 20 as the basis of further correction. The prediction computer may be constructed according to either FIG. 4 or FIG. 5, although other prediction computers are equally applicable. In each adaptive correction system, a servo response feedback signal $\theta_N$ is applied to the correction system as an indication of the required type of correction.

In FIG. 6, the servo response $\theta_N$ is subtracted in adder 22 from the prediction computer input signal $R_N$ to derive a signal $R_N - \theta_N$. The servo response $\theta_N$ is also subtracted in adder 24 from the prediction computer output $D_N$ to derive a signal $D_N - \theta_N$. Signals $R_N - \theta_N$ and $D_N - \theta_N$ are added in adder 26 to derive the adaptively corrected output signal $E_N$.

In the adaptive correction system of FIG. 7, the prediction computer output $D_N$ is stored in store 28 for one sampling period to derive a delayed signal $D_{N-1}$. The servo response signal $\theta_N$ is subtracted in adder 30 from signal $D_{N-1}$ to derive a signal $D_{N-1} - \theta_N$. The servo response $\theta_N$ is also subtracted in adder 32 from prediction computer output $D_N$ to derive a signal $D_N - \theta_N$. Signals $D_{N-1} - \theta_N$ and $D_N - \theta_N$ are added in adder 34 to derive an adaptively corrected output signal $E_N$.

In the adaptive correction system of FIG. 8, the output signal $D_N$ from the prediction computer is stored in store 36 for one sampling period to derive a delayed signal $D_{N-1}$. The delayed signal $D_{N-1}$ is subtracted in adder 38 from prediction computer input signal $R_N$ to derive an output signal $R_N - D_{N-1}$. Signal $R_N - D_{N-1}$ is added in adder 40 to signal $D_N$ to derive a signal $D_N + R_N - D_{N-1}$, from which in adder 42 the servo response signal $\theta_N$ is then subtracted to derive adaptively corrected output signal $E_N$.

When using adaptive corrections together with prediction, it may be desirable to limit the amount of adaptive correction that may be applied in order to provide for greater stability. If the adaptive corrections require additional storage, as in the systems of FIGS. 7 and 8, then the storage requirements are the same as if three-point prediction were used. However, the mathematical manipulation required is less complex with the adaptive correction systems. With the adaptive correction system of FIG. 6, no extra store is required for the correction system.

The servomechanism 44 used in each of the adaptive correction systems must be chosen by matching its velocity error coefficient with the sampling period of the system. Where the sampling period $T_S = 0.1$ sec, the servo must drive the response $\theta_N$ (developed by prediction) in 0.1 sec. Since the sampling frequency in cycles per second should equal the servo zero axis crossover frequency in radians per second, the velocity error coefficient of the drive should be 10 radians/second/radian.

Figure 9:
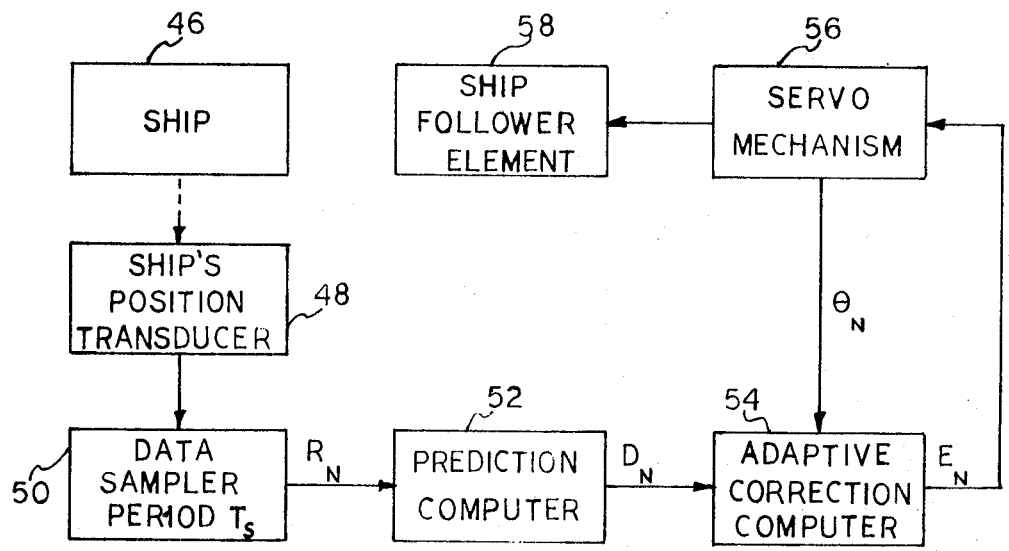
FIG. 9 is an overall block diagram of a ship's position follower using prediction and adaptive correction systems.

FIG. 9 is an overall block diagram of a system in which the adaptive correction system is used in connection with a ship to activate a ship following element, such as a gun mount. The position of a ship 46 (e.g. roll, yaw) is measured by a transducer 48. The transducer output is sampled by a data sampler 50 having a sampling period $T_S$. The sampled data is applied to a prediction computer 52 and adaptive correction computer 54 of the type disclosed in connection with previous figures. The adaptive computer controls a servomechanism 56 as previously described. Servo 56 drives the ship following element 58 to the predicted ship's position.

Thus, it is seen that the overall sampled-data prediction system includes a prediction means and an adaptive correction means, both of which are capable of assuming several forms for different equations of prediction. The invention reduces the complexity of a prediction system for a given order of accuracy by use of adaptive correction.

Structurally, the individual elements of the disclosed circuits are all well-known in the sampled data control field. The store for one sampling period elements 2, 10, 28 and 36 can be any zero-order hold circuit of the type discussed on pp. 48–50 of Jury's *Sampled-Data Control Systems*, John Wiley & Sons, 1958. The adders 4, 16, 22, 24, 26, etc., can be any summing amplifier of the type typified by amplifier 36 in U.S. Pat. No. 3,225,179. An analog inverter can be placed in any input or output path requiring signal inversion. Doubler 12 can use any suitable amplifier having an output signal with twice the amplitude of the input signal. Scalers 6 and 14 can be potentiometer. Thus, all of the basic elements are seen to be found in the prior art.

What is claimed as new and desired to secure by Letters Patent of the United States is:

1. A system for predicting the position of a vehicle subject to periodic motion at a future instant of time and driving a servomechanism to follow the position comprising:
    A. means for providing sampled data $R_N$ corresponding to the vehicle's position,
    B. prediction means receiving the sampled data $R_N$ and using a predetermined prediction formula for deriving a value $D_N$ of the vehicle's position predicted for said future instant of time,
    C. an adaptive correction means for receiving the predicted value signal $D_N$ and responsive to at least one additional servo response signal $\theta_N$ representative of the vehicles instantaneous actual position for further refining the predicted value to derive a signal $E_N$ to more accurately approximate the vehicle's future position, and
    D. a servomechanism responsive to said signal $E_N$ for deriving said additional signal $\theta_N$ as a servo response signal and for controlling a vehicle following element.

2. A system according to claim 1 wherein said prediction means further comprises:
    A. storage means for storing the sampled data signal $R_N$ for one sampling period to derive a delayed signal $R_{N-1}$ and
    B. computation means for generating said predicted value $D_N$ according to an equation $D_N = R_N + K(R_N - R_{N-1})$, where $K$ is a scaling constant which may be unity.

3. A system according to claim 1 wherein said prediction means further comprises:
    A. storage means for storing the sampled data signal $R_N$ for one sampling period to derive a delayed signal $R_{N-1}$ and
    B. computation means for generating said predicted value $D_N$ according to an equation $D_N = 2KR_N - R_{N-1}$, where $K$ is a scaling constant.

4. A system according to claim 3 wherein said scaling constant is chosen to approximate $\cos \omega_R T_S$, where said sampling period is $T_S$ and the period of movement of said vehicle is $(1/\omega_R)$.

5. A system according to claim 1 wherein said adaptive correction means further comprises computation means responsive to said signals $R_N$, $D_N$ and $\theta_N$ for deriving said signal $E_N$ according to the equation $E_N = D_N + R_N - 2\theta_N$.

6. A system according to claim 1 wherein said adaptive correction means further comprises:
    A. storage means for storing the predicted signal value $D_N$ for one sampling period to derive a delayed signal $D_{N-1}$, and
    B. computation means responsive to said signals $D_N$, $D_{N-1}$, and $\theta_N$ for deriving said signal $E_N$ according to equation $E_N = D_N + D_{N-1} - 2\theta_N$.

7. A system according to claim 1 wherein said adaptive correction means further comprises:
    A. storage means for storing the predicted signal value $D_N$ for one sampling period to derive a delayed signal $D_{N-1}$, and
    B. computation means responsive to said signals $D_N$, $D_{N-1}$, $R_N$ and $\theta_N$ for deriving said signal $E_N$ according to equation $E_N = D_N + (R_N - D_{N-1}) - \theta_N$.

* * * * *